(12) United States Patent
Araujo Nieto et al.

(10) Patent No.: US 10,500,927 B2
(45) Date of Patent: Dec. 10, 2019

(54) FOLDING VANE AND AIR REGISTER INCORPORATING A FOLDING VANE

(71) Applicant: FORD GLOBAL TECHNOLOGIES, LLC, Dearborn, MI (US)

(72) Inventors: Jorge Araujo Nieto, Calimaya (MX); Alfredo Pérez Montiel, Tula de Allende (MX); Fernando Ovando, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 15/491,461

(22) Filed: Apr. 19, 2017

(65) Prior Publication Data
US 2018/0304725 A1    Oct. 25, 2018

(51) Int. Cl.
*B60H 1/34*   (2006.01)
(52) U.S. Cl.
CPC ............ *B60H 1/3421* (2013.01); *B60H 1/345* (2013.01); *B60H 2001/3464* (2013.01)
(58) Field of Classification Search
CPC .................. B60H 1/3421; B60H 1/345; B60H 2001/3464

USPC .......................................................... 454/155
See application file for complete search history.

(56) References Cited

U.S. PATENT DOCUMENTS

| | | | |
|---|---|---|---|
| 5,529,092 A | 6/1996 | Arnoldt | |
| 5,687,768 A | 11/1997 | Mull, Jr. et al. | |
| 5,779,536 A | 7/1998 | McCorkel et al. | |
| 6,800,023 B2 * | 10/2004 | Demerath | F24F 13/15 454/155 |
| 8,127,798 B2 | 3/2012 | Yoskowitz | |
| 9,470,429 B2 | 10/2016 | Hopper et al. | |
| 9,878,596 B2 * | 1/2018 | Ross | B60H 1/34 |
| 2018/0003401 A1 * | 1/2018 | Ediger | F24F 7/007 |

FOREIGN PATENT DOCUMENTS

EP    1810857 A1 *    7/2007    .......... B60H 1/3421

\* cited by examiner

*Primary Examiner* — Gregory L Huson
*Assistant Examiner* — Dana K Tighe
(74) *Attorney, Agent, or Firm* — Vichit Chea; King & Schickli, PLLC

(57) ABSTRACT

A folding vane for an air register includes a vane body having a first section, a second section and a hinge joint connecting the first section and the second section. An air register includes a support and at least one folding vane. A method of distributing air from an air register is also disclosed.

9 Claims, 6 Drawing Sheets

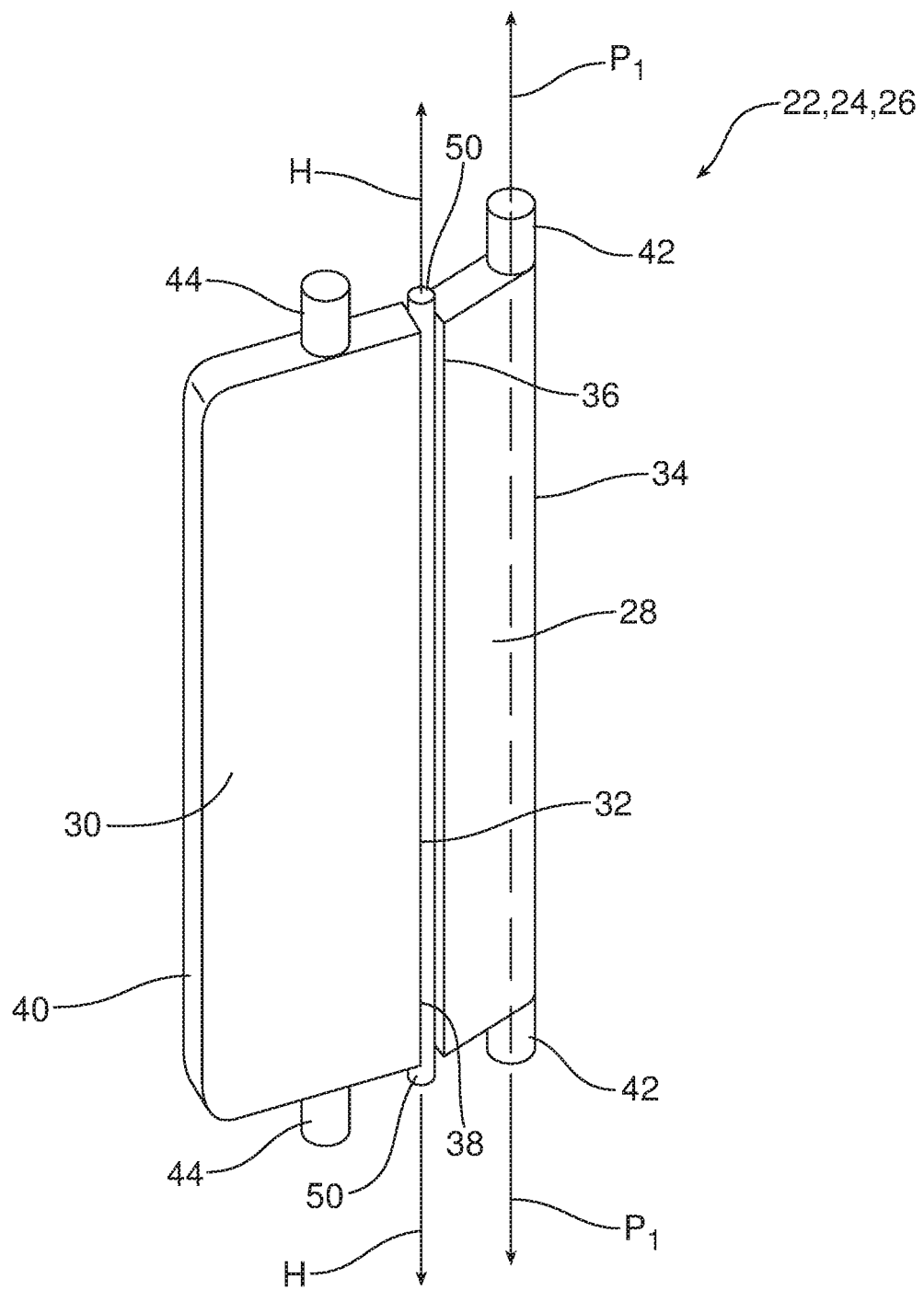

FOLDING VANE AND AIR REGISTER INCORPORATING A FOLDING VANE

TECHNICAL FIELD

This document relates generally to the motor vehicle equipment field and, more particularly, to a folding vane for an air register used with a heating, ventilation and air conditioning (HVAC) system of a motor vehicle wherein the folding vane provides for improved airflow control and performance.

BACKGROUND

It is well known in the art to provide air registers with adjustable vanes to allow one to control the distribution of air from an HVAC system in a motor vehicle.

This document relates to a new and improved folding vane for an air register and a new and improved air register incorporating at least one folding vane. Advantageously, the new and improved air register provides a number of benefits and advantages including, but not necessarily limited to (a) better directional control of the airflow to reach target areas within a passenger compartment of a motor vehicle and (b) to allow airflow to be directed in a wider angle than possible with static vanes in a rigid housing as utilized in state of the art air registers.

SUMMARY

In accordance with the purposes and benefits described herein, a folding vane is provided for an air register. That folding vane comprises a vane body having a first section, a second section and a hinge joint connecting the first section and the second section.

The first section of the folding vane may include a first end and a second end while the second section of the folding vane may include a proximal end and a distal end. The second end may be connected to the proximal end by the hinge joint.

The folding vane may further include a pivot at the first end. In addition, the pivot may include opposed pivot pins defining a pivot axis. Further, the hinge joint may define a hinge axis. The hinge axis may be parallel to the pivot axis.

In accordance with an additional aspect, an air register is provided incorporating the folding vane. More specifically, in some embodiments that air register may comprise at least one folding vane carried on a support. The at least one folding vane may have a vane body including a first section, a second section and a hinge joint connecting the first section and the second section.

The first section may include a first end and a second end. The second section may include a proximal end and a distal end. The second end may be connected to the proximal end by the hinge joint.

The pivot at the first end may pivotally connect the at least one folding vane to the support. That pivot may include opposed pivot pins defining a pivot axis. The hinge joint may define a hinge axis and the hinge axis may be parallel to the pivot axis.

The second section may include opposed guide pins and the support may include opposed arcuate guide tracks. The opposed guide pins slide in the opposed arcuate guide tracks as the at least one folding vane is displaced to direct the control of airflow through the air register.

In addition, the support may include opposed arcuate hinge tracks. The hinge joint may include opposed hinge pins that slide in the opposed arcuate hinge tracks as the at least one folding vane is displaced to control the flow of air through the air register. The opposed arcuate guide tracks may have a first radius of curvature $R_1$ and the opposed arcuate hinge tracks may have a second radius of curvature $R_2$ where $R_1 > R_2$.

In accordance with an additional aspect, a method is provided of distributing air from an air register. That method comprises the steps of pivoting a folding vane about a pivot axis and folding the folding vane about a hinge axis. In addition the method may include the step of increasing the angular range of air distribution from the air register by both pivoting and folding the folding vane.

Still further, the method may include the step of sweeping a first section of the folding vane about the pivot axis through a first arc. Further, the method may include over-rotating a section of the folding vane past the first arc. In addition, the method may include the step of displacing the hinge axis about the pivot axis when pivoting the folding vane about the pivot axis.

In the following description, there are shown and described several preferred embodiments of the folding vane, the air register incorporating a folding vane and the related method of distributing air from an air register. As it should be realized, the folding vane, the air register and the related method are capable of other, different embodiments and their several details are capable of modification in various, obvious aspects all without departing from the folding vane, air register and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the folding vane, the air register and the method of distributing air from an air register and together with the description serve to explain certain principles thereof.

FIG. 2 is a detailed perspective view of a folding vane of the air register illustrated in FIG. 1.

Figure 1:
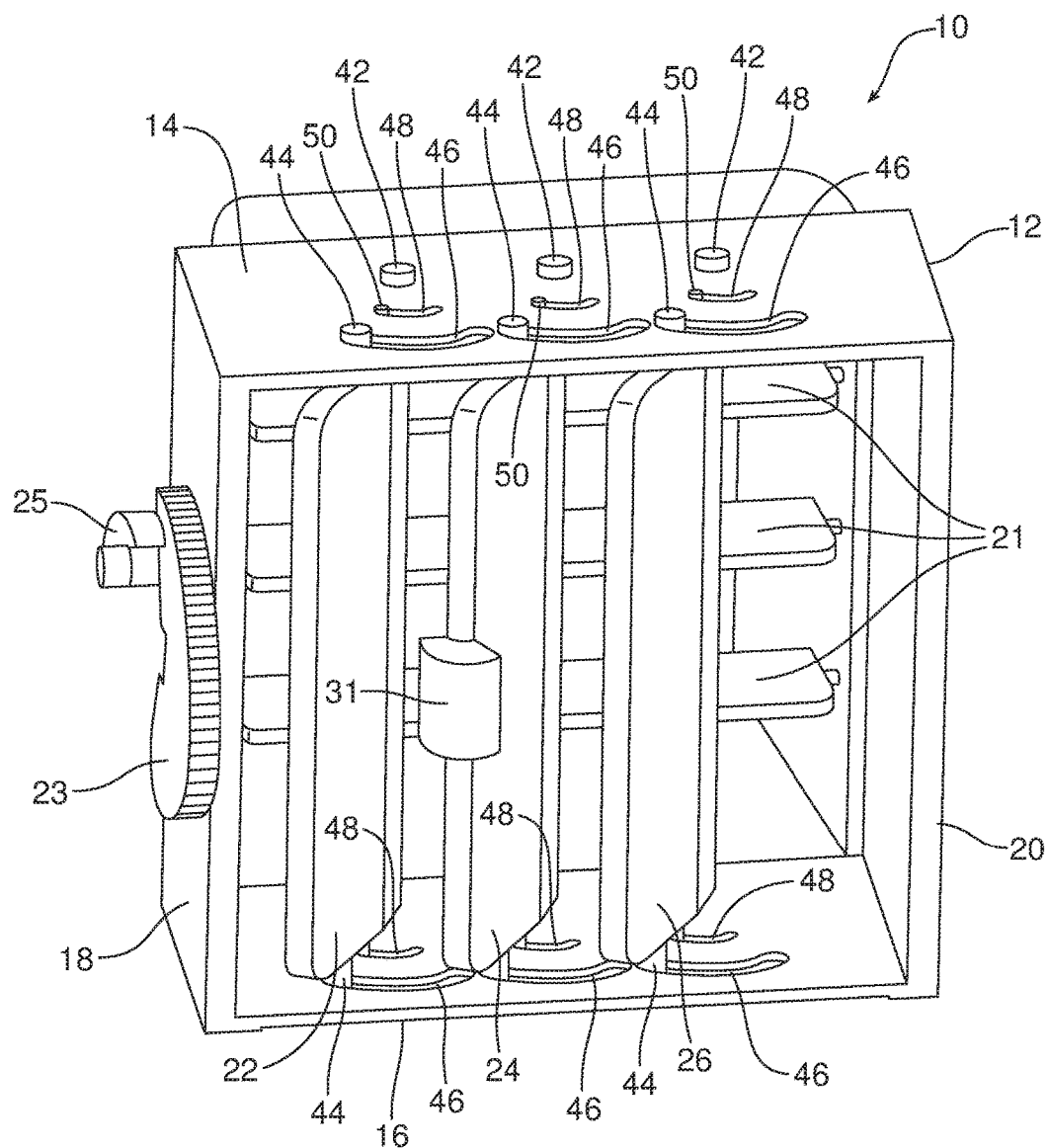
FIG. 1 is a detailed perspective view of the air register.
Figure 3A:
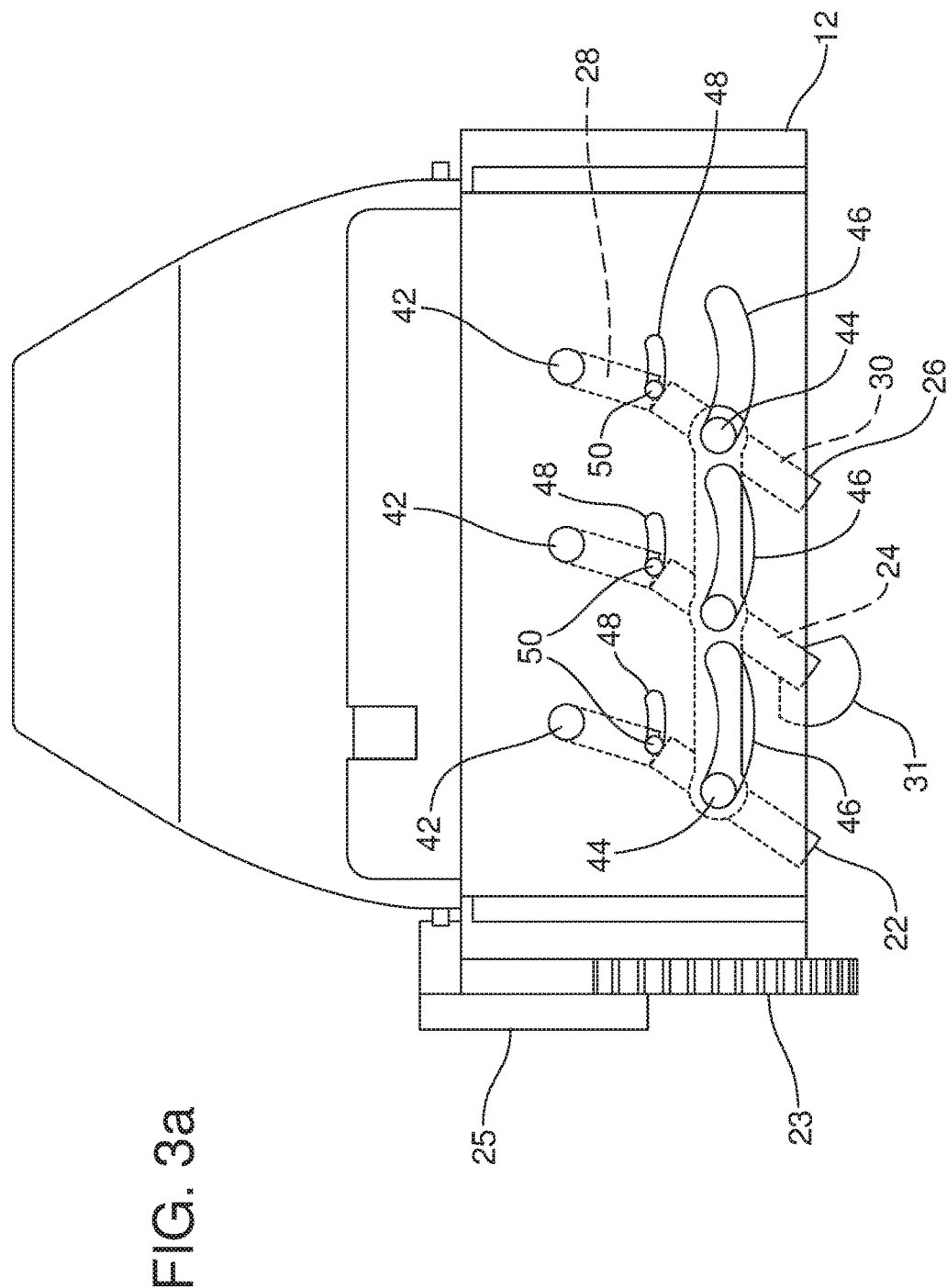
FIGS. 3a-3c are a series of top plan schematic views illustrating the folding vanes of the air register in three different positions.
Figure 3B:
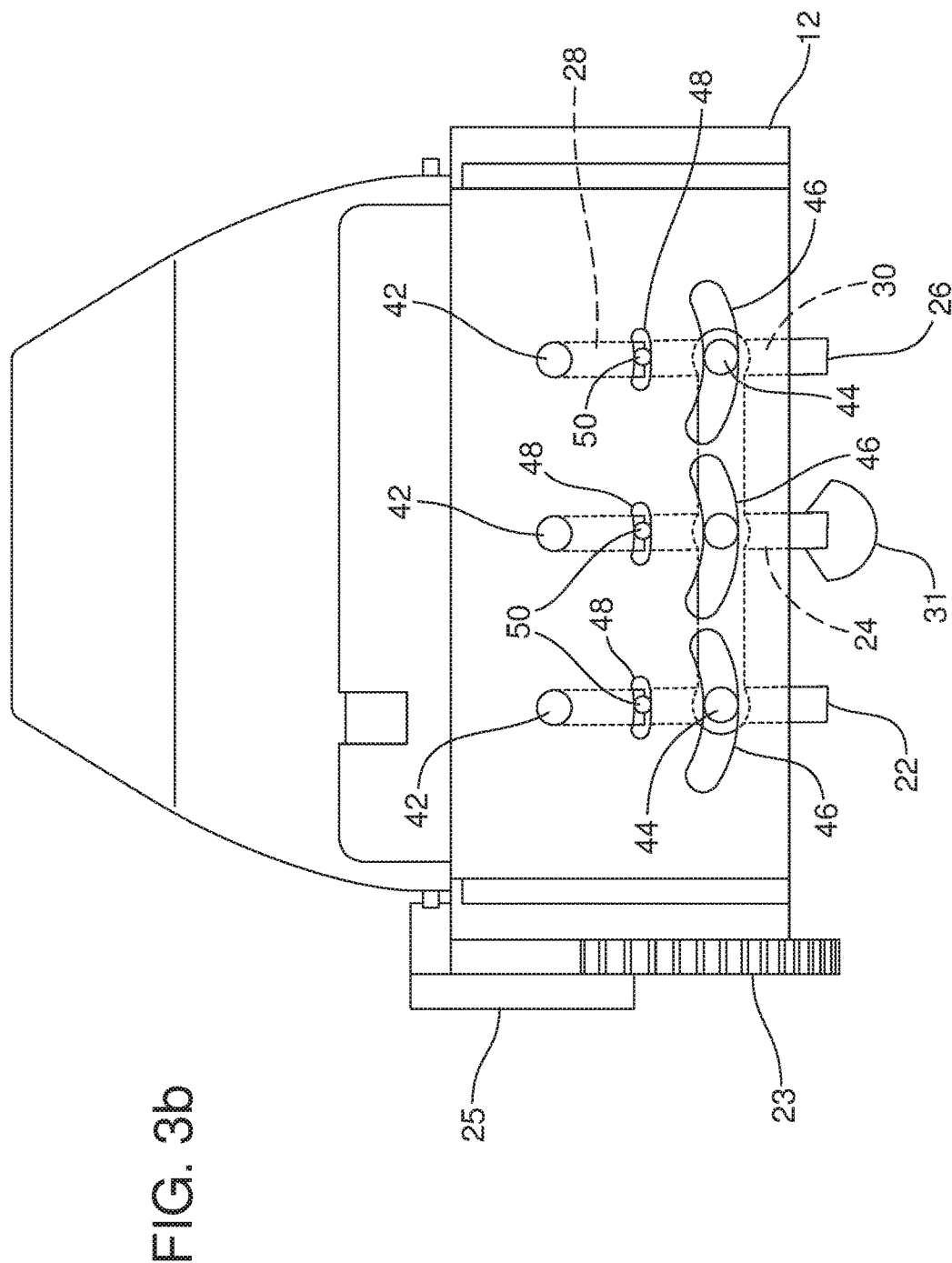
Figure 3C:
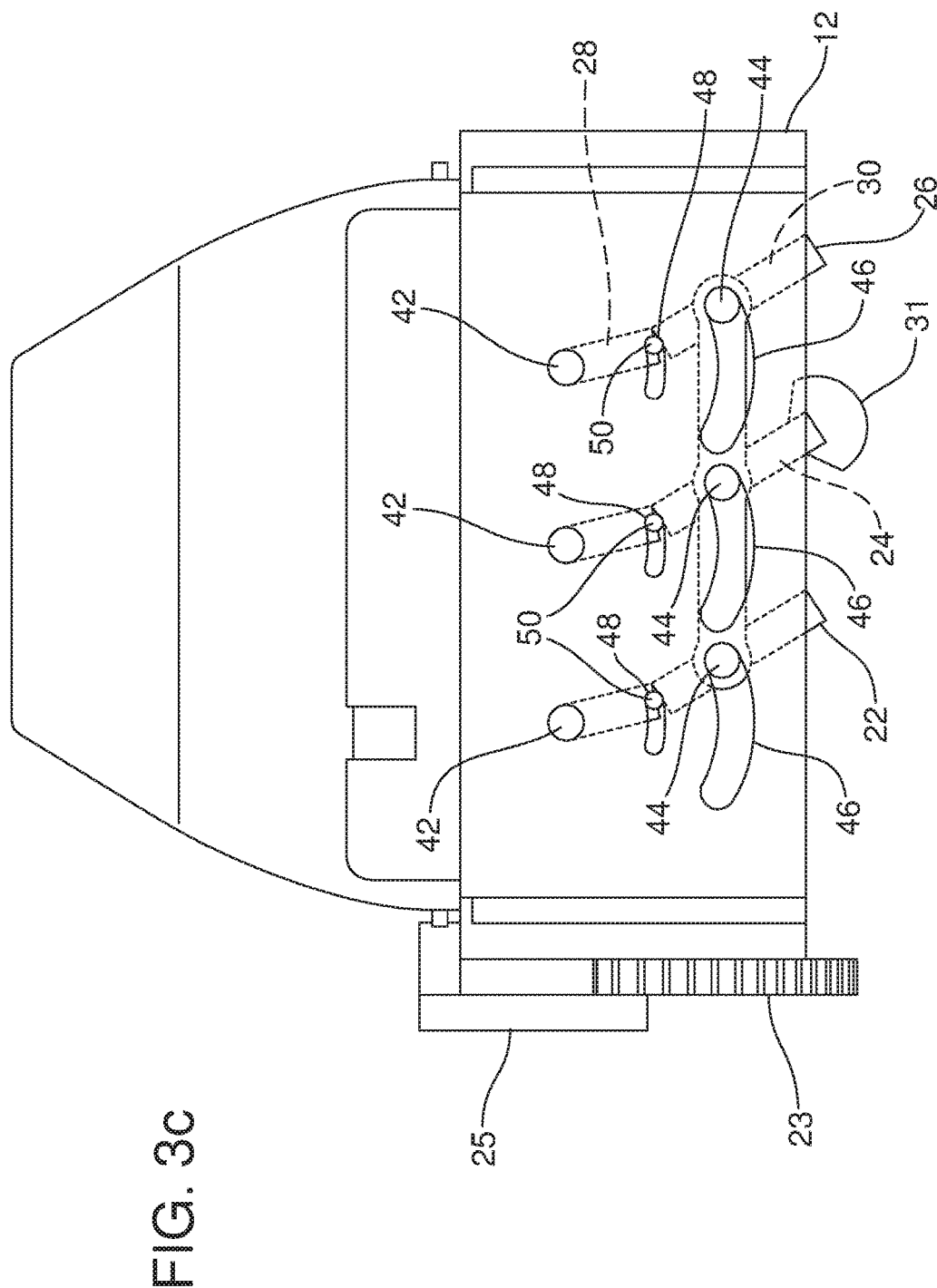

Reference will now be made in detail to the present preferred embodiments of the air register and related method of distributing air from an air register, examples of which are illustrated in the accompanying drawing figures.

DETAILED DESCRIPTION

Reference is now made to FIGS. 1, 2 and 3a-3c which illustrate the new and improved air register 10. That air register 10 includes a support 12 having a top wall 14, a bottom wall 16, a first sidewall 18 and a second sidewall 20 defining an air register outlet. The air register 10 includes a first set of vanes 21, controlled by the actuator 23 that is connected to the vanes by the link 25. This first set of vanes 21 may be tipped upward or downward to control airflow and distribution in a first, and in the illustrated embodiment, vertical direction.

The air register 10 also includes a second set of vanes to control airflow and distribution in a second, and in the illustrated embodiment, horizontal direction. That second set of vanes comprises at least one folding vane and, more particularly, the illustrated embodiment includes three folding vanes 22, 24, 26. Those folding vanes 22, 24, 26 are connected together by a tie rod arrangement 29 so that they may be moved in unison by engaging and manipulating the actuator 31 (see FIG. 3a). As illustrated in detail in FIG. 2, each folding vane 22, 24, 26 has a vane body including a first section 28, a second section 30 and a hinge joint 32 connecting the first section and the second section.

More specifically, each first section 28 includes a first end 34 and a second end 36 and each second section 30 includes a proximal end 38 and a distal end 40. The hinge joint 32 connects the second end 36 of the first section 28 with the proximal end 38 of the second section 30. A first pivot 42 is provided at the first end 34 of the first section 28. The first pivot 42 includes opposed pivot pins defining a first pivot axis $P_1$. Similarly, the hinge joint 32 defines a hinge axis H that is parallel to the first pivot axis $P_1$.

The second section 30 includes opposed guide pins 44 and the support 12 includes opposed arcuate guide tracks 46 in the top wall 14 and the bottom wall 16. The opposed guide pins 44 slide in the opposed arcuate guide tracks 46 as the folding vanes 22, 24, 26 are displaced between the first end position illustrated in FIG. 3a, the second end position illustrated in FIG. 3c and the intermediate or straightaway position illustrated in FIG. 3b.

As further illustrated, the support 12 also includes opposed arcuate hinge tracks 48 in the top wall 14 and the bottom wall 16. The hinge joint 32 includes opposed hinge pins 50 that slide in the opposed arcuate hinge tracks 48 as the folding vanes 22, 24, 26 are displaced between the three positions illustrated in FIGS. 3a-3c. Here it should be noted that the opposed arcuate guide tracks 46 have a first radius of curvature $R_1$ and the opposed arcuate hinge tracks 48 have a second radius of curvature $R_2$ where $R_1 > R_2$. Thus, as the folding vanes 22, 24, 26 are displaced between the three positions illustrated in FIGS. 3a-3c, the hinge joint 32 and the hinge axis H are displaced about the first pivot axis $P_1$. As will be described in greater detail below this provides the folding vanes 22, 24, 26 with an over-rotation that effectively increases the angular range of air distribution from the air register 10.

Figure 4:
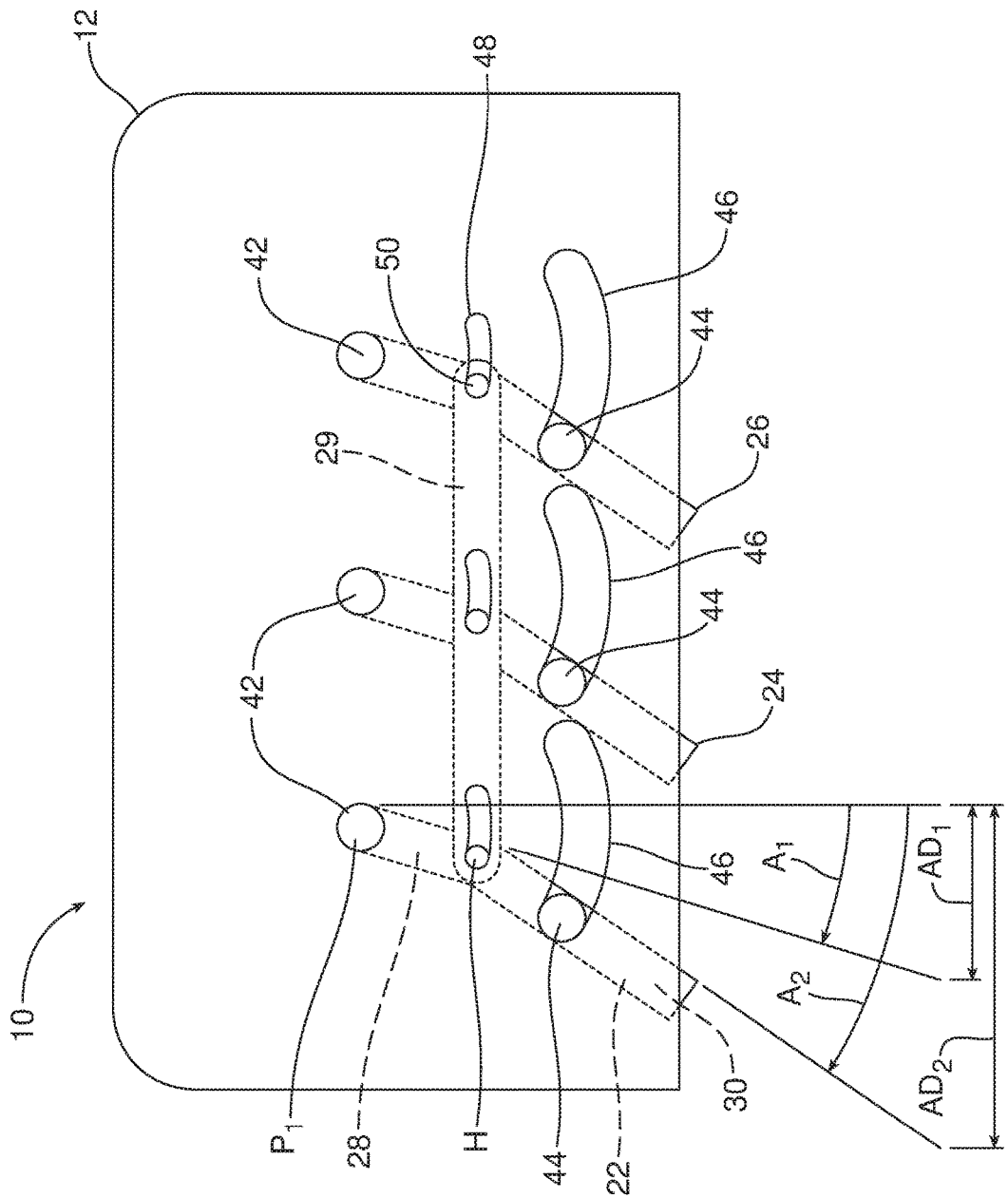
FIG. 4 is a detailed top plan view illustrating how the folding vanes provide an increased angle of air distribution when compared to a static, straight vane.

Consistent with the above description, a method is provided of distributing air from the air register 10. That method comprises the step of pivoting a folding vane 22 about a pivot axis $P_1$ and folding the folding vane about a hinge axis H. As best illustrated in FIG. 4, the method may also include the step of increasing the angular range of air distribution from the air register 10 by both pivoting and folding the folding vane 22. More specifically, as illustrated in FIG. 4, the method includes sweeping the first section 28 of the folding vane 22 through a first arc $A_1$ and over-rotating the second section 30 of the folding vane past the first arc through a second greater arc $A_2$. Thus, while an air register of a given size including static or straight vanes would provide a relatively narrow air distribution pattern $AD_1$, an air register 10 equipped with folding vanes 22, 24, 26 provides a relatively wide air distribution pattern $AD_2$.

As a consequence, it should be appreciated that a narrower air register 10 may be used to provide a desired width of air distribution. This opens space on the instrument panel for other components or controls and significantly increases the styling freedom of designers. Accordingly, the air register 10 represents a significant advance in the art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An air register, comprising:
   a support including opposed arcuate hinge tracks; and
   at least one folding vane carried on said support, said at least one folding vane having a vane body including a first section, a second section and a hinge joint connecting said first section and said second section wherein said hinge joint includes opposed hinge pins sliding in said opposed arcuate hinge tracks.

2. The air register of claim 1, wherein said first section includes a first end and a second end and said second section includes a proximal end and a distal end, said second end being connected to said proximal end by said hinge joint.

3. The air register of claim 2, further including a pivot at said first end pivotally connecting said at least one folding vane to said support.

4. The air register of claim 3, wherein said pivot includes opposed pivot pins defining a pivot axis.

5. The air register of claim 4, wherein said hinge joint defines a hinge axis and said hinge axis is parallel to said pivot axis.

6. The air register of claim 5, wherein said second section includes opposed guide pins and said support includes opposed arcuate guide tracks, said opposed guide pins sliding in said opposed arcuate guide tracks.

7. The air register of claim 6, wherein said opposed arcuate guide tracks have a first radius of curvature $R_1$ and said opposed arcuate hinge tracks have a second radius of curvature $R_2$ where $R_1 > R_2$.

8. A method of distributing air from an air register, comprising:
   pivoting a folding vane about a pivot axis;
   folding said folding vane about a hinge axis;
   increasing angular range of air distribution from said air register by both pivoting and folding said folding vane;
   sweeping a first section of said folding vane about said pivot axis through a first arc; and
   over-rotating a second section of said folding vane past said first arc.

9. The method of claim 8, including displacing said hinge axis about said pivot axis when pivoting said folding vane about said pivot axis.

* * * * *